United States Patent [19]

Jennings

[11] Patent Number: 4,685,553

[45] Date of Patent: Aug. 11, 1987

[54] CONTAINER INVERTER

[76] Inventor: Michael W. Jennings, 1058 Salerno Dr., Campbell, Calif. 95008

[21] Appl. No.: 800,310

[22] Filed: Nov. 21, 1985

[51] Int. Cl.$^4$ .............................................. B65G 47/24
[52] U.S. Cl. .................................. 198/405; 198/627; 198/839; 198/840
[58] Field of Search ............... 198/405, 627, 817, 604, 198/626, 839, 840, 842

[56] References Cited

U.S. PATENT DOCUMENTS

| 435,667 | 9/1890 | Richardson | 198/840 X |
| 1,581,120 | 4/1926 | Hitchcock | 198/790 |
| 1,719,175 | 7/1929 | Finn | 198/405 |
| 1,919,705 | 7/1933 | Petersen | 198/405 X |
| 3,542,184 | 11/1970 | Ruckman | 198/627 X |
| 3,583,544 | 6/1971 | Prodzenski | 198/404 |
| 3,767,028 | 10/1973 | Rosso | 198/405 |
| 4,479,574 | 10/1984 | Julius et al. | 198/405 X |

FOREIGN PATENT DOCUMENTS 490265 11/1974 Australia .............................. 198/405

OTHER PUBLICATIONS

S.J.I. Industries, Inc., "SJI Rinser Full Length Bottle Transport."

Primary Examiner—Joseph E. Valenza
Assistant Examiner—Jonathan D. Holmes
Attorney, Agent, or Firm—Gerald L. Moore

[57] ABSTRACT

Container transporting apparatus comprising a plurality of pulleys (16) each supported by a support (30,28) in spaced pairs to maintain one or more belts (15) forming a path along which the containers are transported. Each pulley includes guides (24) for maintaining the belts aligned on the pulley and idler wheels (47) for aligning the belts with the pulley. The support for the pulleys includes a locking assembly (31) allowing the position of the pulley to be adjusted for transporting different sizes of containers.

2 Claims, 6 Drawing Figures

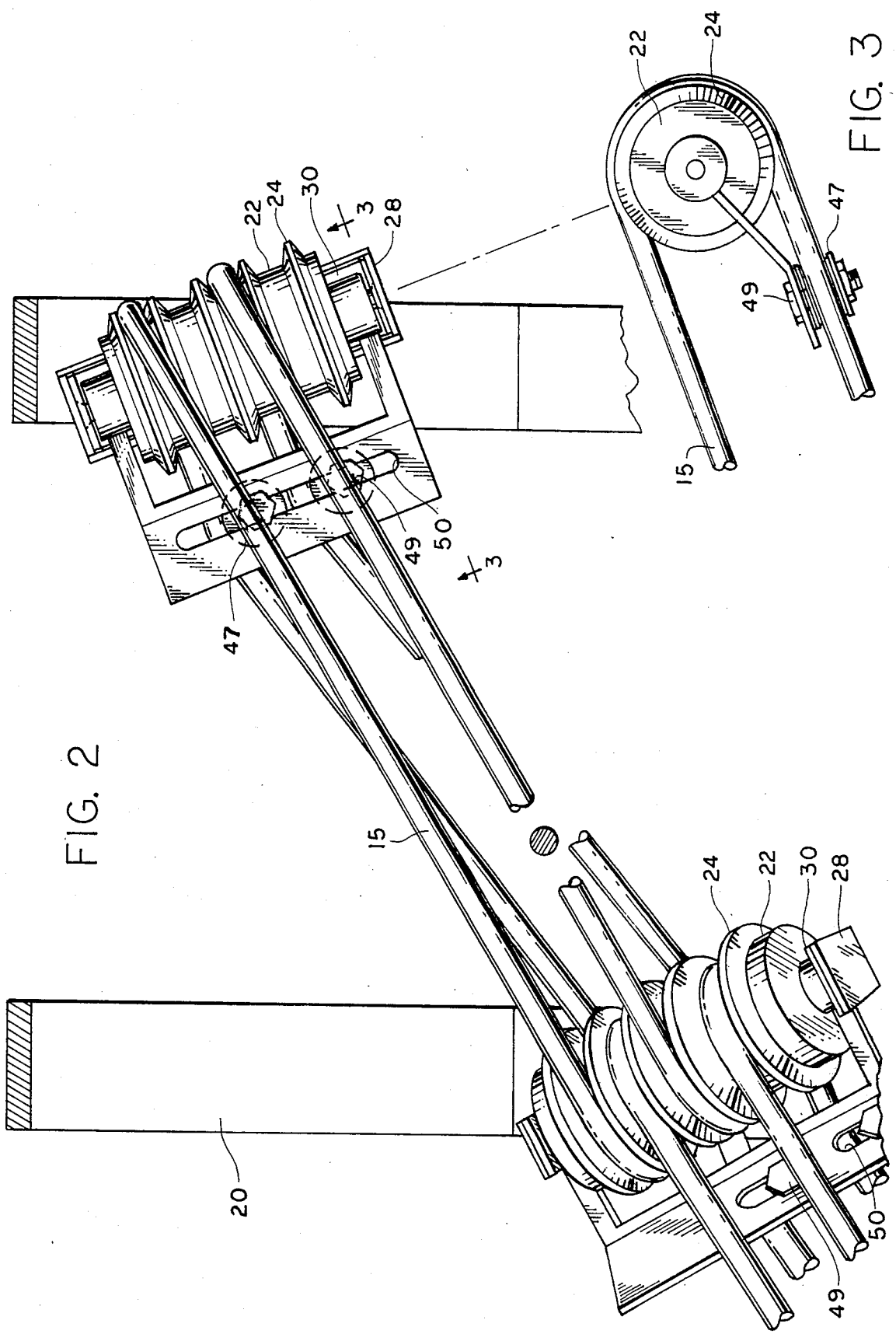

CONTAINER INVERTER

FIELD OF THE INVENTION

This invention relates to a versatile in-line container inverter that can handle containers of varying sizes.

BACKGROUND OF THE INVENTION

Inverters are incorporated into fill lines primarily for inverting the containers so that they can be cleansed and sterilized. One important design requirement for such inverters is shortness in length because fill lines for containers tend to be long and since the line components are usually positioned serially, the shorter each component is the better. One way to shorten inverters is to change the level of the containing path; however, this arrangement results in the containers passing beneath other containers, which in not good from a sanitary standpoint, and also requires a more complicated structure. Additionally, the inverters usually swing the containers with the open end outward and anything inside the containers can become a projectile due to centrifugal force.

Other types of inverters are the pusher and rail type wherein the containers are pushed by drive belts through a set of spaced stationary rails. These rails are twisted so as to invert the container as it is pushed therealong. These types of inverters usually require fittings to accommodate various sizes. Additional problems can also be encountered because the containers are pushed together through the rail inverter section and friction with plastic containers is greater than for glass.

It is the purpose of this invention to provide a belt inverter which is less expensive and simpler in design and can be quickly and easily converted for use of with different sized containers.

SUMMARY OF THE INVENTION

A container inverter apparatus comprising a plurality of pairs of pulleys positioned in spaced relationship and angularly offset relative to each other. The pulley pairs are positioned one on each side of a path along which containers are to be propelled. Each pulley comprises means for handling a plurality of belts and around each pair of adjacent pulleys is positioned a belt. Means support the pulleys and belts so they are spaced from the container path with the angular offset serving to rotate the container in a plane extending normal to the direction of travel. The belts extend from each pulley to adjacent pulleys in both directions along the container path. Means are provided for driving one pulley on each side of the path which serves to drive all of the pulleys on each path side such that the sections of each belt adjacent the container path are all moving in the same direction to transport the container. The means supporting the pulleys allow adjustment of the spacing between the pulleys on opposite sides of the path for handling of containers of varying sizes. Idler pulleys also align each belt with the associated drive pulley as it enters engagement therewith so the belts can be driven with a greater twist for quicker rotation of the containers.

DESCRIPTION OF THE DRAWINGS

FIG. 2 shows one pair of pulleys with belts;

FIG. 3 is an end view along the line 3—3 of FIG. 2; and

DESCRIPTION OF THE INVENTION

Figure 1:
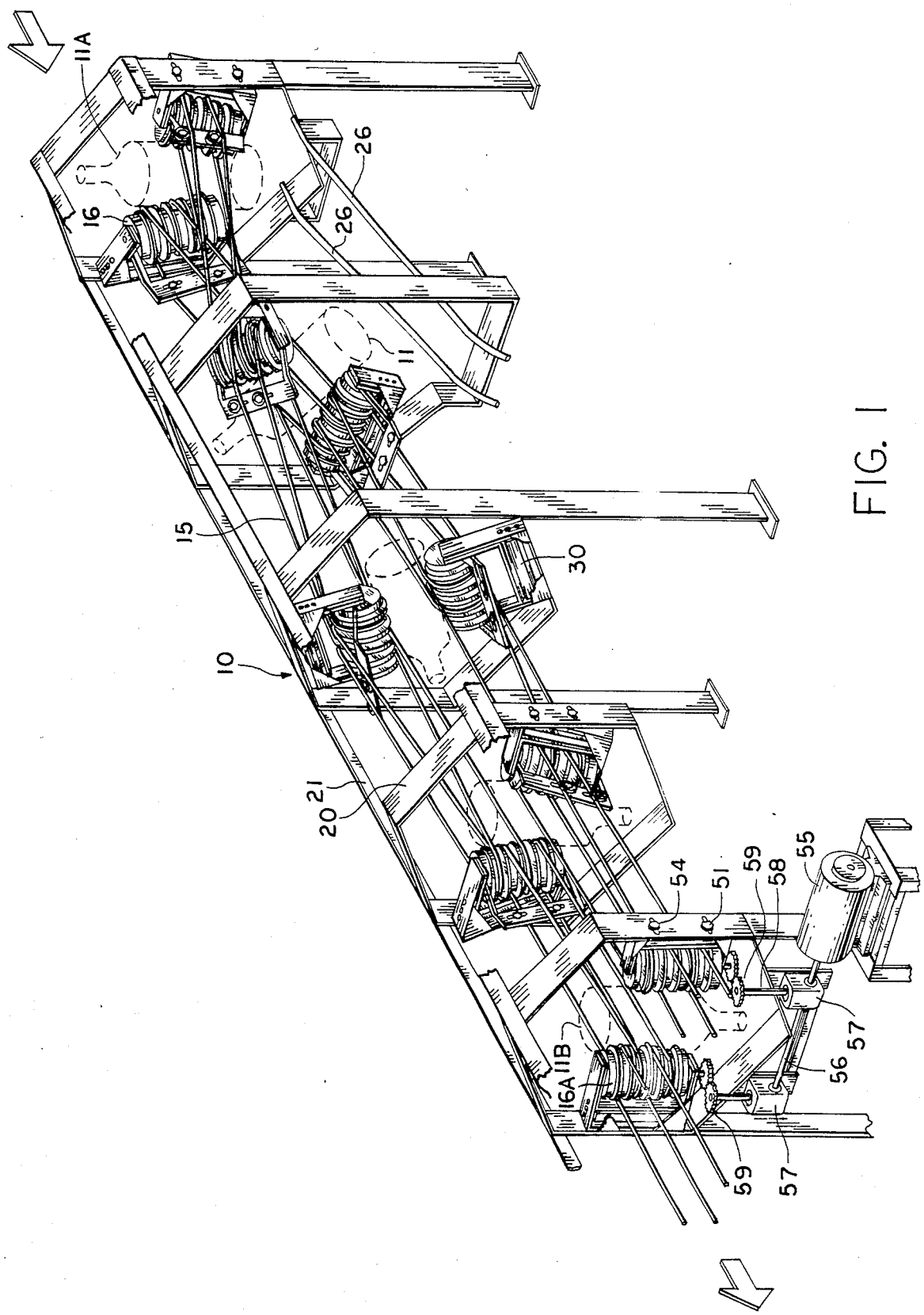
FIG. 1 is a perspective view of a container inverter incorporating the subject invention and showing the containers in dotted outline.
Figure 5:
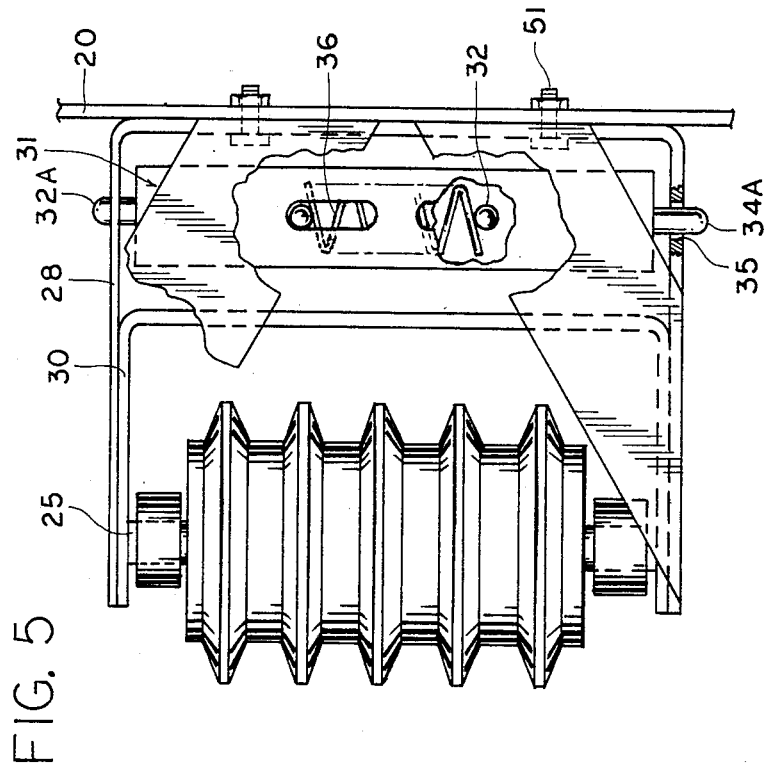
FIGS. 4, 5, and 6 are views of a pulley and support.
Figure 6:
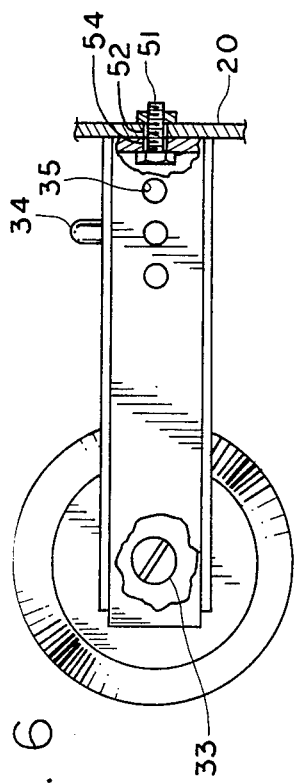
Figure 4:
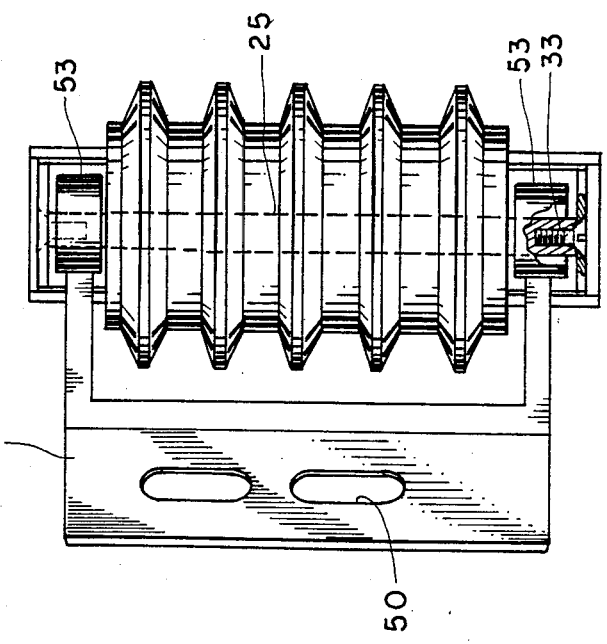

In FIG. 1 the invention is shown in a perspective view in the form of a bottle inverter 10 used for the purpose of turning a bottle 11 shown in dotted outline from the upright position 11A to the inverted position 11B. The container is carried and propelled forward by a plurality of endless belts 15 supported about pairs of pulleys 16. The pulleys 16 are supported to each side of the container path along which each container 11 is propelled. The pulleys are spaced apart and angularly displaced relative to each other along the path of the container so as to turn the containers in the plane extending normal to the direction of travel. Thus, the containers enter in the upright position and exit in the inverted position or vice versa.

The pulleys are supported on a frame comprising a plurality of sections 20 connected by longitudinal members 21. The pulleys are each on a shaft 25 and comprise a cylindrical body member 22 having a therearound a plurality of guides 24. The guide members maintain the endless belts in the desired spaced relationship and prevent the belts from riding up or down the pulley as they would ordinarily due to the twisting of the belt as it passes through the angular displacement between pulleys. Also, the "V-grooves" between the guides hold the belts away from the body member to allow use of round belts which are necessary to effect the necessary twisting. A pair of rails 26 supported at the bottom of the frame catch any containers which are not held by the inverter as they enter the first section. Generally, a receptacle will be positioned to receive such containers.

In accordance with one feature of the invention, the pulleys are supported for positioning towards and away from the container path to allow the handling of containers of varying sizes. In the embodiment shown, the pulleys are mounted in a U-shaped member 30 by flat head screws 33 threaded into the shaft 25. Outside the support member 30 is a second support 28. This support 28 is held by a locking assembly 31 that allows the pulley and support 30 to be moved along the member 28. By grasping the extending pins 32 and 34 and by pulling them towards each other so as to disengage the ends 34A and 32A, respectively, from the support 28 and reset these ends into different openings 35. The pins 32 and 34 are spring loaded by a compression spring 36 extending between the pins. The support 28 is bolted to the frame sections 20. In this manner, each pulley can be adjusted in and out towards and away from the container path to accommodate different sizes of containers.

In accordance with a second feature of the invention, idler pulleys or wheels 47 are fixed to a plate 48 by bolts 49 in a position to serve as guide means and align the belt 15 as it approaches the driven pulley 22. The bolt 49 passes through a slot 50 in the plate 48 to allow adjustment of the wheel from one side to the other. The driven pulley 22 is also adjustable in position with the bolts 51 each passing through a slot 52 in the C-shaped member 28 and a second slot 54 in the frame section 20 to provide pulley adjustment means. Thus, the pulley position can be shifted axially and turned the limit of the slots to better align the pulley with the belts. The pulleys 16 also are supported in the same manner as the pulleys 22 with bolts 51 passing through slots 52 and 54 to allow adjustment of the pulley positions. The plates 48 are each attached to a shaft collar 53 riding on the shaft 25.

Thus, with the idler wheel aligning the endless belt with the driven pulley, adjustment of the pulley positions, and use of round belts the pulleys can be angularly displaced more relative to each other for a quicker rotation of the container. In this manner, the overall length of the inverter is shortened because each stage imparts more rotation to the container. The pulleys are driven by a motor 55 connected by a drive shaft 56 to a pair of gear boxes 57. These gear boxes drive through the shafts 58 a gear combination 59 connected to the last stage pulleys of the inverter. Each of the pulleys with the exception of those at the entrance and exit ends of the inverter, include belts which extend both ways to the adjacent pulleys. Thus, by driving the first set of pulleys at each side of the inverter, all of the pulleys and belts are driven in unison. Because the belts 15 are twisted slightly and ride on the sides of the grooves formed between the ridges 24, the belts are continually rolled over resulting in an even wear of all surfaces of the belt and preventing the formation of ridges thereon which might otherwise interfere with the efficient transport of containers.

Thus, there is provided a building block of pulley belt combinations that can be assembled into a transport for containers. Each combination comprises a pair of pulleys 22 with an idler pulley positioned to align the belts with the driving pulley and adjustable in position when supported on a satisfactory frame to handle varying sized containers. Combinations of these pulley-belt assemblies can be mounted to perform varying functions such as inverting, partially rotating or changing directions of containers.

I claim:

1. Container handling apparatus comprising:
   a plurality of pulleys having grooves each adapted for supporting and driving an endless belt;
   means rotatably supporting said pulleys to each side of a container path and in spaced relationship and at attitudes angularly displaced relative to the next preceding pulley along said container path;
   a plurality of endless belts with substantially circular cross sections each supported around adjacent pairs of pulleys to form a continuous twisted path;
   means driving said pulleys so that all belt segments adjacent said container path travel in the same direction to propel a container along said path, and
   grooved guide means positioned adjacent and at substantially right angles to said pulleys for laterally engaging said belts to bend and partially align said belts with said supporting pulleys as they approach said supporting pulleys such that the displacement angle between the belt and pulleys is partially accommodated for by the guide means and partially by the pulleys to allow a greater angular displacement between adjacent pulleys.

2. Container handling apparatus as defined in claim 1 wherein said means rotatably supporting said pulleys includes adjustable means to allow at least some of said pulleys to be moved toward and away from said container path to accommodate larger and smaller containers.

* * * * *